UNITED STATES PATENT OFFICE.

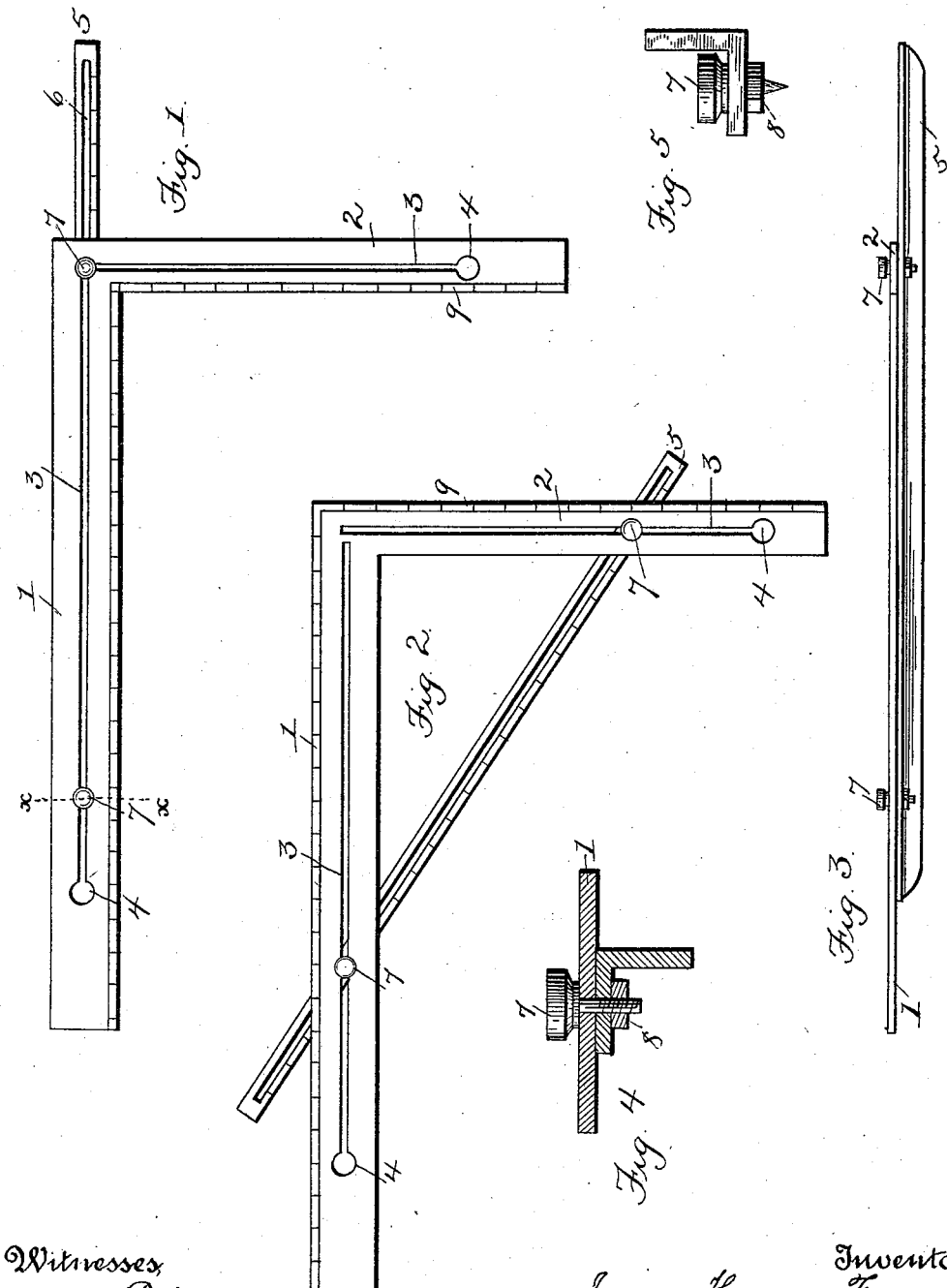

JAMES HARVEY FRENCH, OF DEFIANCE, OHIO, ASSIGNOR OF ONE-HALF TO HENRY J. SMITH, OF SAME PLACE.

SQUARE AND PITCH-BOARD.

SPECIFICATION forming part of Letters Patent No. 456,216, dated July 21, 1891.

Application filed February 25, 1891. Serial No. 382,763. (No model.)

*To all whom it may concern:*

Be it known that I, JAMES HARVEY FRENCH, a citizen of the United States, residing at Defiance, in the county of Defiance and State of Ohio, have invented certain new and useful Improvements in Squares, of which the following is a specification, reference being had therein to the accompanying drawings.

This improvement relates to that class of squares which are provided with an adjustable bar designed to be secured at different angles to the two arms of the square; and the invention consists in the peculiar construction, arrangement, and combinations of parts hereinafter more particularly described, and then definitely claimed.

In the accompanying drawings, Figure 1 shows a plan of the square with the movable bar set parallel with the long arm. Fig. 2 shows a similar view with the movable bar set at an angle. Fig. 3 shows a side view with the movable bar set as in Fig. 1. Fig. 4 is an enlarged cross-section through the line $x$ $x$, Fig. 1. Fig. 5 shows the bar detached and the screws reversed.

Referring now to the details of the drawings by figures, 1 2 represent the long and short arms of the square, respectively, each arm being provided with slots 3 3, as shown, one end of each slot terminating in a round hole 4. Beneath the square is set the movable bar 5, having a slot 6 running from near one end to near the other end, which is secured to the square proper by set-screws 7, preferably pointed, as shown in Fig. 5, and having nuts 8, as shown more distinctly in Fig. 4. Both the square and bar are provided with scales, as shown at 9 9.

By the construction above set forth a very strong, durable, and convenient square is formed which can be made very cheaply and will be found very useful for a variety of purposes. As shown in Fig. 1, the device may be used to measure intermediate spaces and secured at the desired position by the set-screws, or the bar 5 may be set at any desired angle to get the desired bevel on rafters, braces, &c., and the length of the same. It will also be found very useful in stair-work, as said bar 5 can be set at any desired angle.

If it is desired to use the square alone, the screws may be loosened, and then by moving them to the holes 4 they can be slipped through said holes, and thus the said parts may be readily detached and either part used without the other.

If the screws are made pointed, by removing and reversing them, as shown in Fig. 5, the bar 5 may be used to describe circles of any size within its limits. When the screws are set in their normal positions, the depending flange of the angle-bar will prevent their scratching anything with which the points might otherwise come in contact. Besides this the bar 5, being of angle-iron or steel, will serve to stiffen the square very much when in use jointly with the square, and if the nuts are made of the proper size the flange will prevent the nuts from turning when the screws are being tightened or loosened.

What I claim as new is—

The combination, with the slotted square 1 2, of the slotted bar 5, the set-screws 7, having points formed on the ends of their shanks, and the nuts 8, engaging the threads of said screws, said bar 5 having a depending flange serving the double purpose of stiffening said bar and preventing the points of the screws from scratching when the same are used as set-screws, substantially as described.

In testimony whereof I affix my signature, in presence of two witnesses, this 23d day of February, 1891.

JAMES HARVEY FRENCH.

Witnesses:
 R. H. GLEASON,
 J. I. HALE.